United States Patent
Ahn et al.

(10) Patent No.: US 11,844,059 B2
(45) Date of Patent: Dec. 12, 2023

(54) WIRELESS COMMUNICATION METHOD FOR UPLINK MULTIPLE-USER TRANSMISSION SCHEDULE AND WIRELESS COMMUNICATION TERMINAL USING THE METHOD

(71) Applicants: WILUS INSTITUTE OF STANDARDS AND TECHNOLOGY INC., Gyeonggi-do (KR); SK TELECOM CO., LTD., Seoul (KR)

(72) Inventors: Jinsoo Ahn, Seoul (KR); Woojin Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 495 days.

(21) Appl. No.: 17/069,864

(22) Filed: Oct. 14, 2020

(65) Prior Publication Data
US 2021/0176770 A1    Jun. 10, 2021

Related U.S. Application Data

(63) Continuation of application No. 15/739,161, filed as application No. PCT/KR2016/006856 on Jun. 27, 2016, now Pat. No. 10,841,931.

(30) Foreign Application Priority Data

Jun. 26, 2015 (KR) .................. 10-2015-0091532
Jul. 7, 2015  (KR) .................. 10-2015-0096770
(Continued)

(51) Int. Cl.
*H04W 4/00*     (2018.01)
*H04W 72/121*   (2023.01)
(Continued)

(52) U.S. Cl.
CPC ............. *H04W 72/121* (2013.01); *H04L 1/00* (2013.01); *H04L 1/1867* (2013.01);
(Continued)

(58) Field of Classification Search
CPC ............... H04W 72/121; H04W 76/18; H04W 56/0005; H04W 72/0413; H04W 72/0446;
(Continued)

(56) References Cited

U.S. PATENT DOCUMENTS

2004/0151144 A1   8/2004  Benveniste
2005/0213601 A1   9/2005  Ginzburg et al.
(Continued)

FOREIGN PATENT DOCUMENTS

| WO | 2011/025278 | 3/2011 |
| WO | 2011/065746 | 6/2011 |
| WO | 2014/088371 | 6/2014 |

OTHER PUBLICATIONS

International Search Report for PCT/KR2016/006856 dated Oct. 18, 2016 and its English translation from WIPO.
(Continued)

*Primary Examiner* — Siren Wei
(74) *Attorney, Agent, or Firm* — Ladas & Parry, LLP

(57) ABSTRACT

The present invention relates to a wireless communication method for uplink multi-user transmission scheduling and a wireless communication terminal using the same. To this end, provided are a base wireless communication terminal comprising a processor and a transceiver, wherein the processor transmits a trigger frame soliciting an uplink multi-user transmission, determines whether the uplink multi-user
(Continued)

transmission is successful based on received uplink multi-user data in response to the trigger frame, and retransmits the trigger frame when it is determined that the uplink multi-user transmission has failed and a wireless communication method using the same.

10 Claims, 18 Drawing Sheets

(30) Foreign Application Priority Data

Jul. 17, 2015 (KR) .......................... 10-2015-0101505
Jul. 23, 2015 (KR) .......................... 10-2015-0104659

(51) Int. Cl.
| | |
|---|---|
| *H04W 84/12* | (2009.01) |
| *H04W 74/04* | (2009.01) |
| *H04L 5/00* | (2006.01) |
| *H04L 1/1867* | (2023.01) |
| *H04L 1/00* | (2006.01) |
| *H04W 72/21* | (2023.01) |
| *H04W 76/18* | (2018.01) |
| *H04W 56/00* | (2009.01) |
| *H04W 72/0446* | (2023.01) |
| *H04W 72/1268* | (2023.01) |
| *H04W 74/08* | (2009.01) |

(52) U.S. Cl.
CPC .......... *H04L 5/0053* (2013.01); *H04L 5/0094* (2013.01); *H04W 56/0005* (2013.01); *H04W 72/0446* (2013.01); *H04W 72/1268* (2013.01); *H04W 72/21* (2023.01); *H04W 74/04* (2013.01); *H04W 76/18* (2018.02); *H04W 84/12* (2013.01); *H04W 74/0808* (2013.01)

(58) Field of Classification Search
CPC . H04W 72/1268; H04W 74/04; H04W 84/12; H04L 1/00; H04L 1/1867; H04L 5/0053; H04L 5/0094

See application file for complete search history.

(56) References Cited

U.S. PATENT DOCUMENTS

| | | | |
|---|---|---|---|
| 2013/0100952 A1* | 4/2013 | Hart | .................... H04L 12/1868 370/432 |
| 2014/0079010 A1 | 3/2014 | Li et al. | |
| 2014/0341100 A1* | 11/2014 | Sun | .......................... H04L 1/08 370/311 |
| 2015/0016558 A1 | 1/2015 | Choi et al. | |
| 2015/0063190 A1* | 3/2015 | Merlin | ................... H04W 72/23 370/312 |
| 2015/0181620 A1 | 6/2015 | Seok | |
| 2015/0382333 A1 | 12/2015 | Seok | |
| 2016/0100408 A1* | 4/2016 | Hedayat | ................ H04L 5/0037 370/329 |
| 2016/0278081 A1* | 9/2016 | Chun | ................. H04W 72/0446 |
| 2017/0325266 A1* | 11/2017 | Kim | .................. H04W 72/0446 |
| 2018/0376486 A1 | 12/2018 | Ahn et al. | |

OTHER PUBLICATIONS

Written Opinion of the International Searching Authority for PCT/KR2016/006856 dated Oct. 18, 2016 and its English machine translation by Google Translate.
Notice of Allowance dated Jul. 9, 2020 for U.S. Appl. No. 15/739,161 (now published as 2018/0376486).
Non-Final Office Action dated Mar. 17, 2020 for U.S. Appl. No. 15/739,161 (now published as 2018/0376486).
Advisory Action dated Jul. 8, 2019 for U.S. Appl. No. 15/739,161 (now published as 2018/0376486).
Final Office Action dated Mar. 28, 2019 for U.S. Appl. No. 15/739,161 (now published as 2018/0376486).
Non-Final Office Action dated Dec. 14, 2018 for U.S. Appl. No. 15/739,161 (now published as 2018/0376486).
Office Action dated Mar. 24, 2022 for U.S. Appl. No. 17/069,863.
Office Action dated Sep. 9, 2022 for U.S. Appl. No. 17/069,863.

* cited by examiner

ABSTRACT# WIRELESS COMMUNICATION METHOD FOR UPLINK MULTIPLE-USER TRANSMISSION SCHEDULE AND WIRELESS COMMUNICATION TERMINAL USING THE METHOD

CROSS-REFERENCE TO RELATED APPLICATIONS

This application is a continuation of U.S. patent application Ser. No. 15/739,161 filed on Jun. 5, 2018, which is the U.S. National Stage of International Patent Application No. PCT/KR2016/006856 filed on Jun. 27, 2016, which claims the priority to Korean Patent Application No. 10-2015-0091532 filed in the Korean Intellectual Property Office on Jun. 26, 2015, Korean Patent Application No. 10-2015-0096770 filed in the Korean Intellectual Property Office on Jul. 7, 2015, Korean Patent Application No. 10-2015-0101505 filed in the Korean Intellectual Property Office on Jul. 17, 2015 and Korean Patent Application No. 10-2015-0104659 filed in the Korean Intellectual Property Office on Jul. 23, 2015, the entire contents of which are incorporated herein by reference.

TECHNICAL FIELD

The present invention relates to a wireless communication method for uplink multi-user transmission scheduling and a wireless communication terminal using the same, and more particularly, to a wireless communication method and a wireless communication terminal for efficiently scheduling simultaneous transmission of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to perform efficient scheduling of data transmission of each terminal in a situation where a downlink single-user transmission, a downlink multi-user transmission, an uplink single-user transmission and uplink multi-user transmission are mixed.

In addition, the present invention has an object to define a subsequent operation method when there is no response to a trigger frame for uplink multi-user transmission.

Technical Solution

In order to achieve the objects, the present invention provides a wireless communication method and a wireless communication terminal as below.

First, an exemplary embodiment of the present invention provides a base wireless communication terminal comprising a processor and a transceiver, wherein the processor transmits a trigger frame soliciting an uplink multi-user transmission, determines whether the uplink multi-user transmission is successful based on received uplink multi-user data in response to the trigger frame, and retransmits the trigger frame when it is determined that the uplink multi-user transmission has failed.

The processor may determine that the uplink multi-user transmission is successful when uplink data is received from at least one of wireless communication terminals indicated by the trigger frame.

The processor may determine that the uplink multi-user transmission has failed when no uplink data in response to the trigger frame has been received.

When it is determined that the uplink multi-user transmission has failed, the processor may obtain a new backoff counter for retransmitting the trigger frame, and perform a backoff procedure based on the obtained new backoff counter.

The processor may retransmit the trigger frame when the channel is idle for a predetermined period of time after the trigger frame has been transmitted.

The predetermined period of time may be set based on a time for receiving a preamble of an uplink multi-user PLCP protocol data unit (PPPU).

The predetermined period of time may be set to be a PCF IFS (PIFS).

The processor may perform the retransmission of the trigger frame until an uplink multi-user transmission based on the retransmission is successful within a predetermined count limit of retransmission or a predetermined time limit of retransmission.

The time limit of retransmission may be set based on an initial transmission opportunity (TXOP) set in the trigger frame.

The processor may attempt to transmit a new trigger frame based on new scheduling information when all the uplink multi-user transmissions based on the retransmission within the count limit of retransmission or the time limit of retransmission have failed.

In addition, an exemplary embodiment of the present invention provides a wireless communication method of a base wireless communication terminal, including: transmitting a trigger frame soliciting an uplink multi-user transmission; determining whether the uplink multi-user transmission is successful based on received uplink multi-user data in response to the trigger frame; and retransmitting the trigger frame when it is determined that the uplink multi-user transmission has failed.

Another exemplary embodiment of the present invention provides a base wireless communication terminal comprising a processor and a transceiver, wherein the processor transmits a first trigger frame soliciting an uplink multi-user transmission, wherein the trigger frame includes resource unit allocation information for wireless communication terminals to perform uplink multi-user transmission, receives uplink multi-user data in response to the transmitted trigger frame, generates new scheduling information for wireless communication terminals that have failed to transmit the uplink multi-user data, and transmits a second trigger frame based on the generated new scheduling information.

When uplink data is not received from a wireless communication terminal to which a first resource unit is allocated through the first trigger frame, the processor may allocate a second resource unit to the corresponding wireless communication terminal through the second trigger frame.

The first trigger frame and the second trigger frame may be different trigger frames transmitted within a predetermined period for consecutive uplink multi-user transmissions.

The processor may receive a buffer status report from at least one wireless communication terminal, and transmit the trigger frame based on the received buffer status report, wherein the buffer status report is transmitted based on a probability value according to an access category of data to be transmitted by the wireless communication terminal.

The higher a priority of an access category of data to be transmitted is, the higher a transmission probability of the buffer status report may be.

In addition, another exemplary embodiment of the present invention provides a wireless communication method of a base wireless communication terminal, including: transmitting a first trigger frame soliciting an uplink multi-user transmission, wherein the trigger frame includes resource unit allocation information for wireless communication terminals to perform uplink multi-user transmission; receiving uplink multi-user data in response to the transmitted trigger frame; generating new scheduling information for wireless communication terminals that have failed to transmit the uplink multi-user data; and transmitting a second trigger frame based on the generated new scheduling information.

Advantageous Effects

According to the embodiment of the present invention, the reliability of the uplink multi-user transmission can be ensured and the performance thereof can be improved through efficient scheduling.

According to another embodiment of the present invention, it is possible to minimize the resource loss by controlling the consecutive uplink multi-user transmission processes depending on the congestion state of the network.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0091532, 10-2015-0096770, 10-2015-0101505 and 10-2015-0104659 filed in the Korean Intellectual Property Office and the embodiments and mentioned items described in the respective application, which forms the basis of the priority, shall be included in the Detailed Description of the present application.

Figure 1:
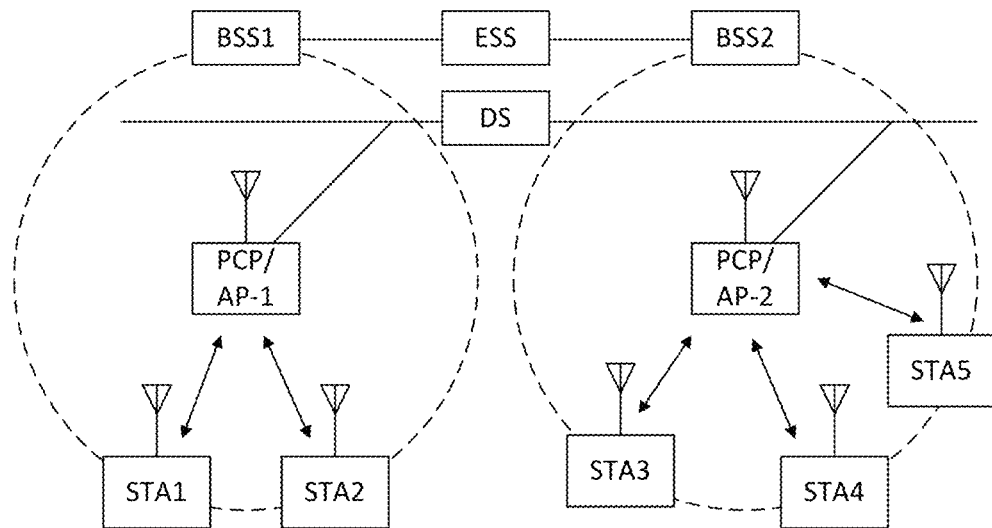
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
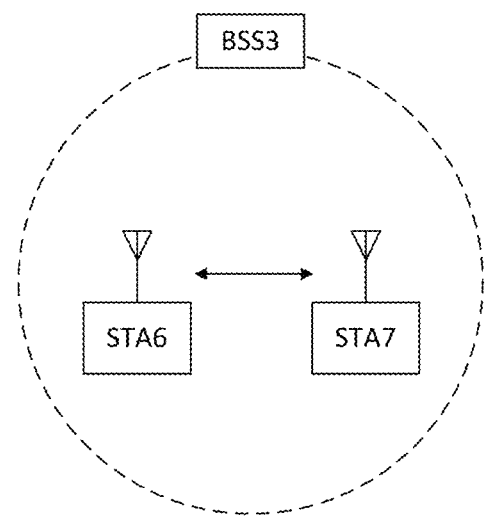
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
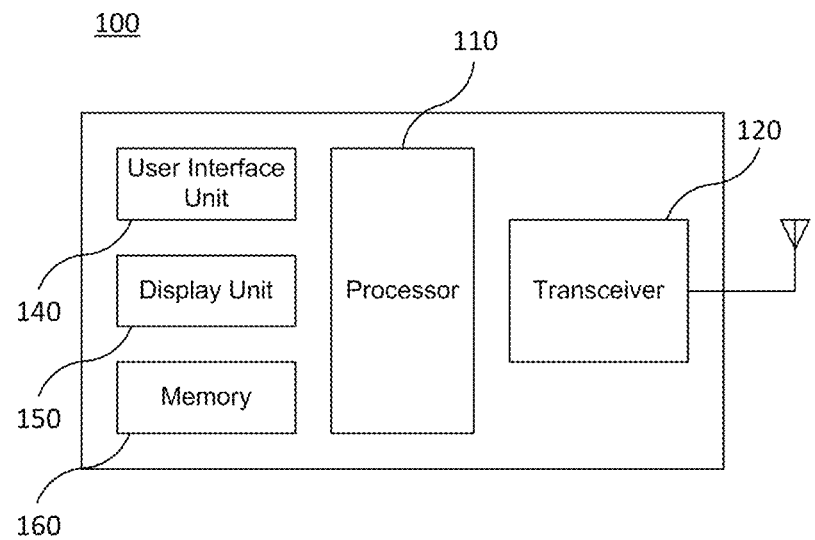
FIG. 3 illustrates a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip. In an embodiment of the present invention, the transceiver 120 may represent a radio frequency (RF) transceiver module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. That is, the processor 110 may be a modem or a modulator/demodulator for modulating and demodulating wireless signals transmitted to and received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
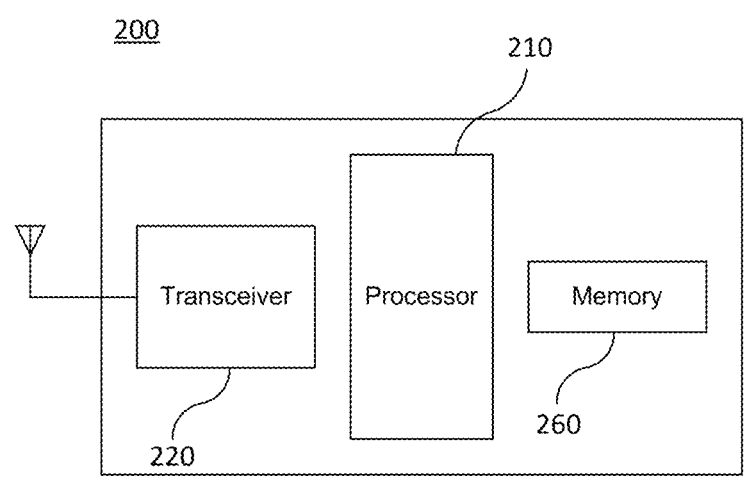
FIG. 4 illustrates a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200. In an embodiment of the present invention, the transceiver 220 may represent a radio frequency (RF) transceiver module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the transceiver 220. The processor 210 controls various operations such as wireless signal transmission/reception of the AP 200 accord- FIG. 5 is a diagram schematically illustrating a process in which a STA sets a link with an AP.

Figure 5:
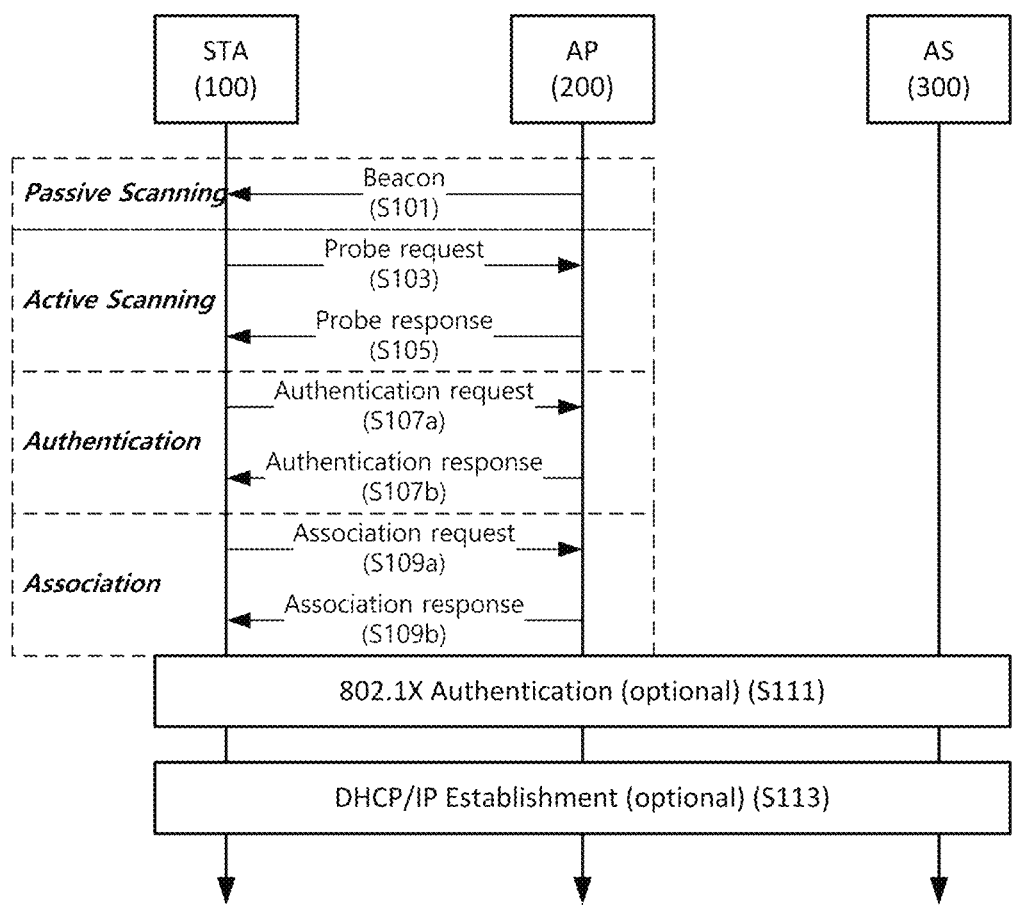
FIG. 5 schematically illustrates a process in which a STA and an AP set a link.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
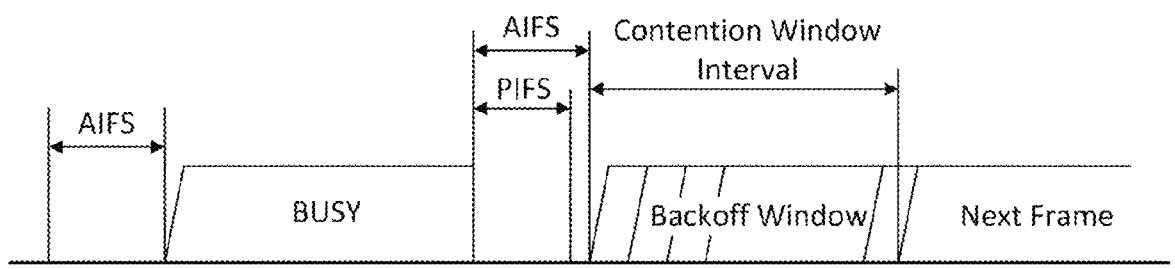
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
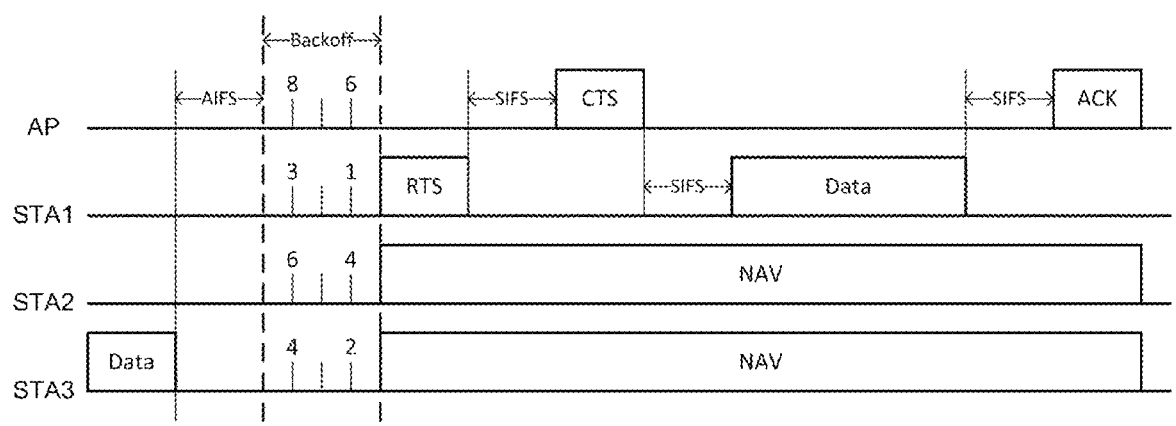
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number assigned to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being assigned with a new random number. In this case, the newly assigned random number may be determined within a range (2*CW) twice larger than a previous predetermined random number range (a contention window, CW).

<Uplink Multi-User Transmission>

When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

In order to perform the UL-MU transmission, the channel to be used and the transmission start time of each STA that performs uplink transmission should be adjusted. In order to efficiently schedule the UL-MU transmission, state information of each STA needs to be transmitted to the AP. According to an embodiment of the present invention, information for scheduling of a UL-MU transmission may be indicated through a predetermined field of a preamble of a packet and/or a predetermined field of a MAC header. For example, a STA may indicate information for UL-MU transmission scheduling through a predetermined field of a preamble or a MAC header of an uplink transmission packet, and may transmit the information to an AP. In this case, the information for UL-MU transmission scheduling includes at least one of buffer status information of each STA, channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the UL-MU transmission process may be managed by the AP. The UL-MU transmission may be performed in response to a trigger frame transmitted by the AP. The STAs simultaneously transmit uplink data a predetermined IFS time after receiving the trigger frame. The trigger frame indicates the data transmission time point of the uplink STAs and may inform the channel (or subchannel) information allocated to the uplink STAs. When the AP transmits the trigger frame, a plurality of STAs transmit uplink data through the respective allocated subcarriers at a time point designated by the trigger frame. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, a UL-MU transmission may be performed based on a contention of a plurality of STAs for a particular resource unit. For example, if an AID field value for a particular resource unit is set to a specific value (e.g., 0) that is not assigned to STAs, a plurality of STAs may attempt random access (RA) for the corresponding resource unit.

<Retransmission of Trigger Frame>

Hereinafter, embodiments in which a trigger frame is retransmitted in the uplink multi-user transmission process will be described with reference to the respective drawings. Specifically, a scheduling method in the case where the AP does not receive any uplink data in response to the trigger frame will be described.

For efficient scheduling of the UL-MU transmission, various parameters to be used in a series of transmission processes should be determined. For example, the size of the contention window used in the backoff procedure for transmitting the trigger frame should be determined. Also, a criterion for determining whether or not the transmission of the uplink multi-user data is successful should be established. In addition, the succeeding operation and the backoff method according to the success or failure determination should be defined.

According to the embodiment of the present invention, the AP may consider that the transmission process is successful even when a part of data is successfully transmitted in the transmission of the uplink multi-user data. That is, when uplink data is received from at least one of the STAs indicated by the trigger frame, the AP determines that the UL-MU transmission process is successful. Thus, the AP transmits an M-BA in response to receiving the uplink multi-user data. On the other hand, when no uplink data in response to the trigger frame is received, the AP determines that the UL-MU transmission process has failed. According to an embodiment, when the UL-MU transmission process is determined to have failed, the trigger frame needs to be retransmitted within a time that the existing scheduling is valid.

FIGS. 8 to 18 illustrate specific embodiments in which a trigger frame is retransmitted in an uplink multi-user transmission process. In each of the embodiments of FIGS. 8 to 18, duplicated descriptions of parts which are the same or corresponding to those of the embodiments of the previous drawings will be omitted.

Figure 8:
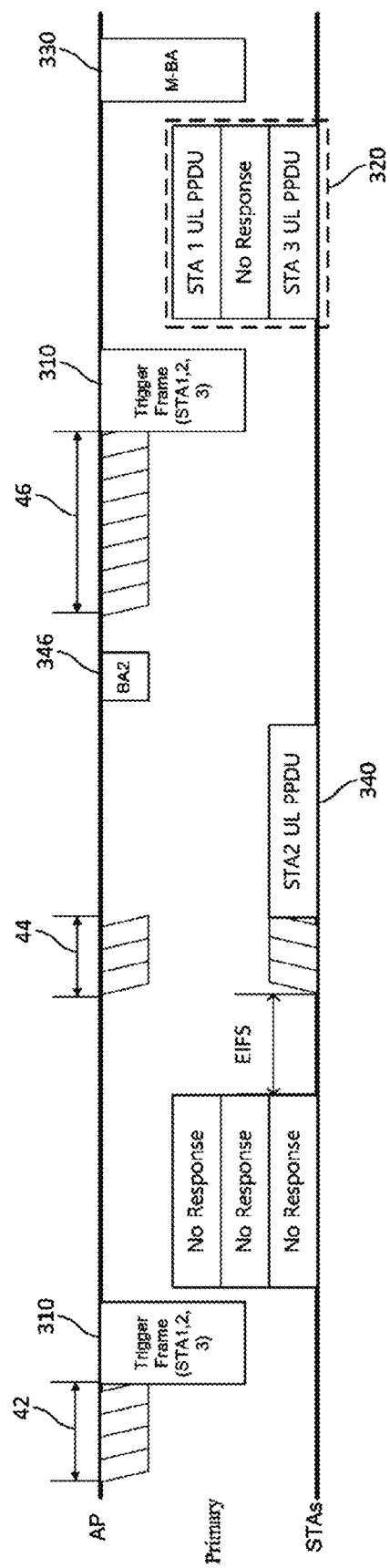
FIG. 8 illustrates an embodiment in which a trigger frame is retransmitted in an uplink multi-user transmission process.

First, referring to FIG. 8, the AP transmits a trigger frame 310 for initiating an UL-MU transmission process. The AP may perform a separate backoff procedure for transmitting the trigger frame 310. When the backoff procedure for transmitting the trigger frame 310 expires in a contention window interval 42, the AP transmits the trigger frame 310. The trigger frame 310 indicates identification information of each STA participating in the UL-MU transmission and information of resource units allocated thereto. In the embodiment of FIG. 8, the trigger frame 310 solicits uplink multi-user data transmission of STA1, STA2 and STA3. However, the AP does not receive any uplink data in response to the trigger frame 310, and performs scheduling for the failure of the UL-MU transmission process.

According to the embodiment of the present invention, the AP may perform retransmission of the trigger frame 310 when the UL-MU transmission process has failed. In this case, the retransmission of the trigger frame 310 may be performed through a channel contention based on existing DCF rules. For the retransmission of the trigger frame 310, the AP obtains a new backoff counter. In this case, the new backoff counter can be determined within a range of twice the contention window used in obtaining the previous backoff counter. That is, when the UL-MU transmission process has failed, the AP doubles the size of the contention window to be used in the backoff procedure of the next contention window intervals 44 and 46. In the contention window intervals 44 and 46, the AP performs a backoff procedure to retransmit the trigger frame 310 based on the new backoff counter. The retransmission of the trigger frame 310 may be performed until the UL-MU transmission based on the retransmission is successful within the preset retransmission limit.

However, since the scheduling applied to multiple users is already completed when the trigger frame 310 is initially transmitted, there is a high probability that a scheduling error occurs when the trigger frame 310 is retransmitted a long time after the initial transmission time. For example, if at least some STAs have already transmitted uplink data before the retransmission time of the trigger frame 310, the existing scheduling information becomes invalid. Referring to the embodiment of FIG. 8, STA2 has won the contention in the next contention window interval 44. Accordingly, the STA2 transmits uplink data 340 to the AP, and the AP transmits an ACK 346 in response thereto. In the next contention window interval 46, the AP wins the contention and retransmits the trigger frame 310. The STAs receive the trigger frame 310 transmitted by the AP and transmit uplink multi-user data 320, that is, an uplink multi-user PLCP protocol data unit (UL MU PPPU). However, since STA2 indicated by the retransmitted trigger frame 310 has already completed the transmission of the uplink data 340, there is a problem that the scheduling information of the retransmitted trigger frame 310 is invalid.

Meanwhile, in the embodiment of the present invention, the uplink multi-user data 320 may be transmitted in a form including at least one of OFDMA and MU-MIMO. If the transmission of the uplink multi-user data 320 is successful, the AP transmits an M-BA 330 in response thereto. The M-BA 330 includes ACK information for STAs that have successfully transmitted the uplink multi-user data 320. In the embodiment of FIG. 8, STA1 and STA3 have successfully transmitted uplink data in response to the trigger frame 310, and the AP transmits ACK information for STA1 and STA3 via the M-BA 330.

Figure 9:
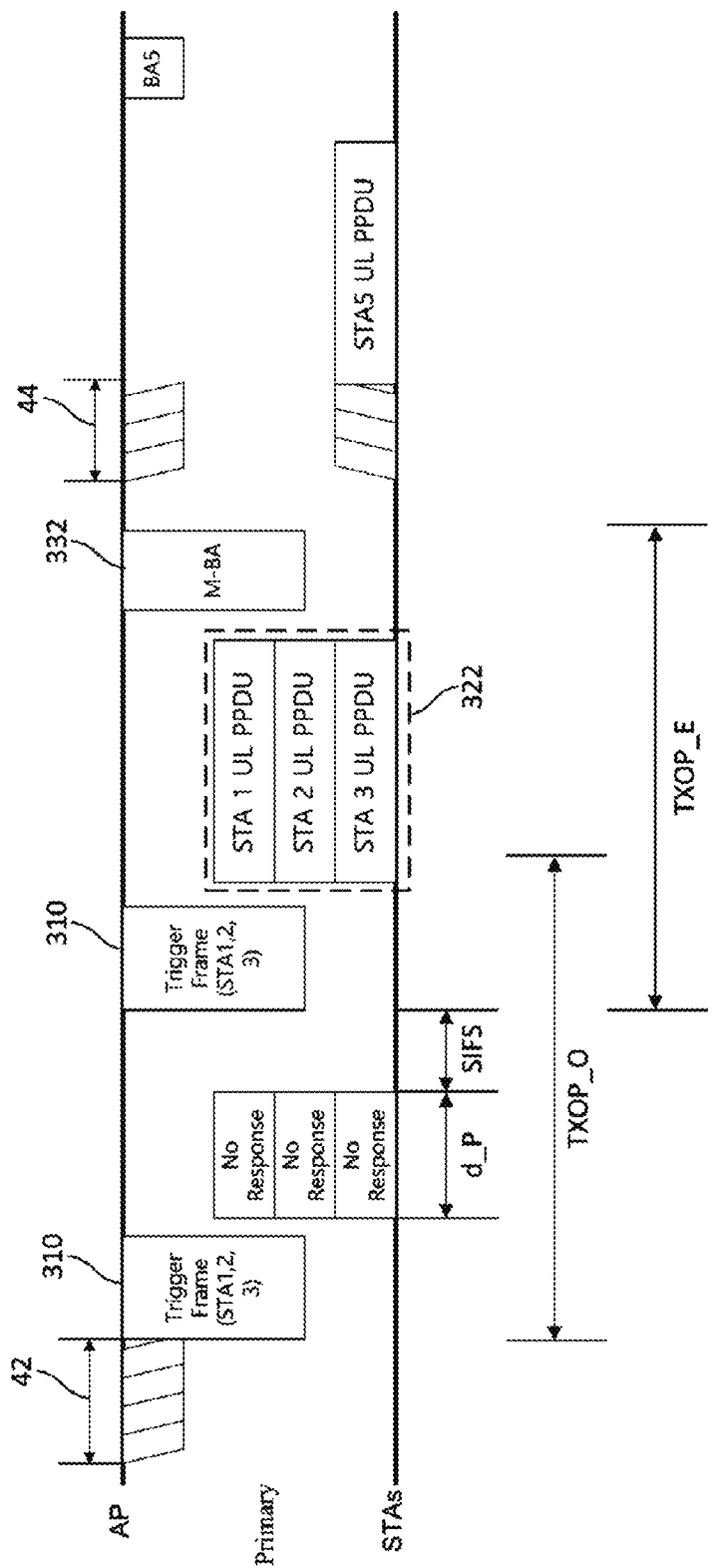
FIGS. 9 and 10 illustrate a trigger frame retransmission method according to an embodiment of the present invention.
Figure 10:
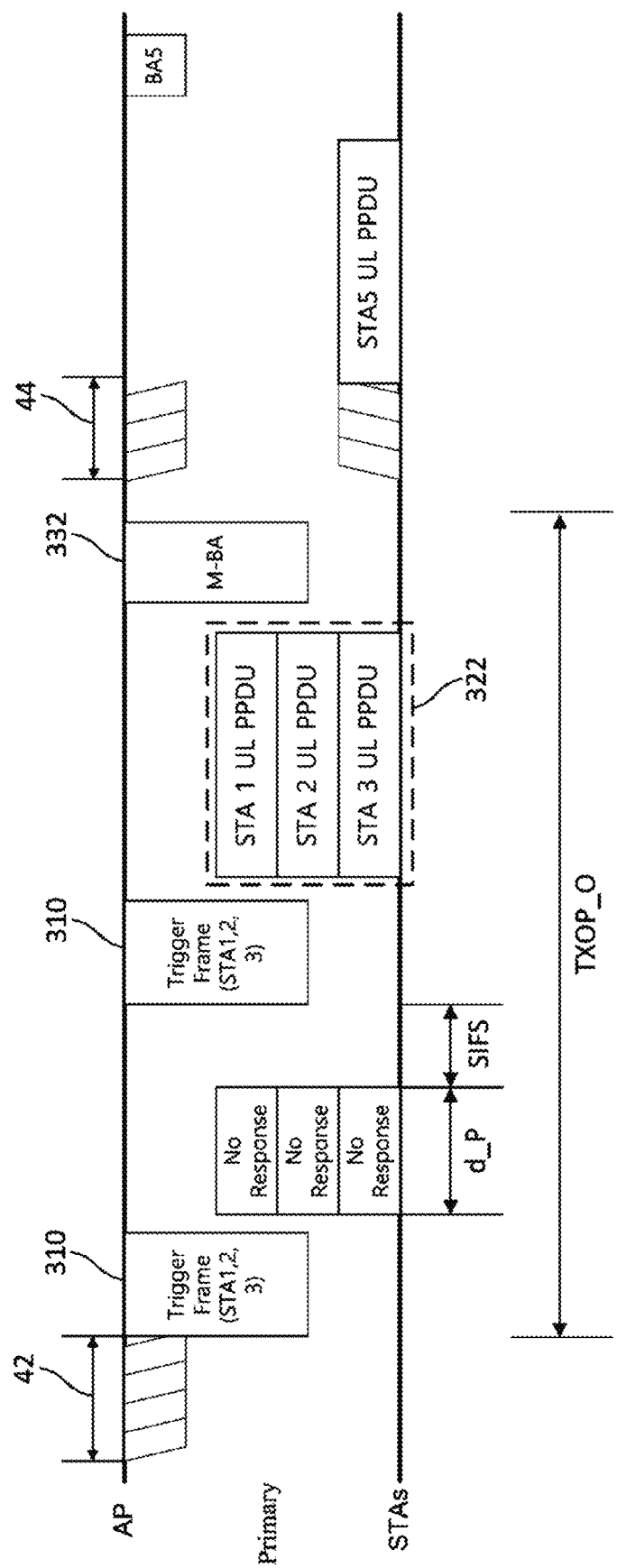

FIGS. 9 and 10 illustrate a trigger frame retransmission method according to an embodiment of the present invention. According to an embodiment of the present invention, the retransmission timing of the trigger frame 310 is determined based on the confirmation timing of whether or not the uplink multi-user data 322 is received in response to the trigger frame 310.

Whether or not the uplink multi-user data 322 is received can be confirmed through the preamble of the UL MU PPDU. If no UL MU PPDU preamble is received for a predetermined transmission period d_P, the AP retransmits the trigger frame 310 immediately when the channel is idle. The retransmission of the trigger frame 310 may be performed until the UL-MU transmission based on the retransmission is successful within a predetermined count limit of retransmission or a predetermined time limit of retransmission. According to an embodiment, the predetermined count limit of retransmission or the predetermined time limit of retransmission may be determined based on duration of the UL MU PPDU specified in the trigger frame 310 or a certain ratio thereof.

Referring to the FIG. 9, when the UL-MU transmission process has failed, the AP may attempt retransmission of the trigger frame 310 during the first transmission opportunity (TXOP), i.e., TXOP_O set by the initial trigger frame 310. If the UL MU PPDU preamble is not received for a predetermined transmission period d_P and the channel is idle, the AP retransmits the trigger frame 310 after a SIFS time. Accordingly, the AP may retransmit the trigger frame 310 after a time of SIFS+d_P+SIFS from the initial transmission completion of the trigger frame 310.

When the trigger frame 310 is retransmitted, the STAs may perform the UL-MU transmission during the extended TXOP, i.e. TXOP_E, newly designated by the retransmitted trigger frame 310. The STAs receive the retransmitted trigger frame 310 and transmit uplink multi-user data 322 in response thereto. In this case, the duration of the uplink multi-user data 322 is set based on TXOP_E. According to an embodiment, the TXOP_E value may be set equal to TXOP_O. Thus, when the trigger frame 310 is retransmitted, the TXOP of the UL-MU transmission may be shifted. In the embodiment of FIG. 9, STA1, STA2 and STA3 have successfully transmitted uplink data in response to the retransmitted trigger frame 310, and the AP transmits ACK information for STA1, STA2 and STA3 via the M-BA 332.

Meanwhile, according to the embodiment of FIG. 10, the AP may perform the UL-MU transmission process based on the retransmitted trigger frame 310 in a limited manner within the TXOP_O period. That is, when the UL-MU transmission process has failed, the retransmitted trigger frame 310 indicates a new TXOP based on the time obtained by subtracting (SIFS+d_P+SIFS) from TXOP_O. Thus, the new TXOP indicated by the retransmitted trigger frame 310 is reduced compared to the O_TXOP indicated by the initial trigger frame 310. The STAs configure uplink data based on the reduced TXOP and transmit the configured uplink data to the AP.

As described above, according to the embodiment of FIGS. 9 and 10, when the UL-MU transmission process has failed, the AP retransmits the trigger frame 310 without any further contention. Accordingly, the AP may increase the probability of success of the UL-MU within the time that the scheduling information is valid.

Figure 11:
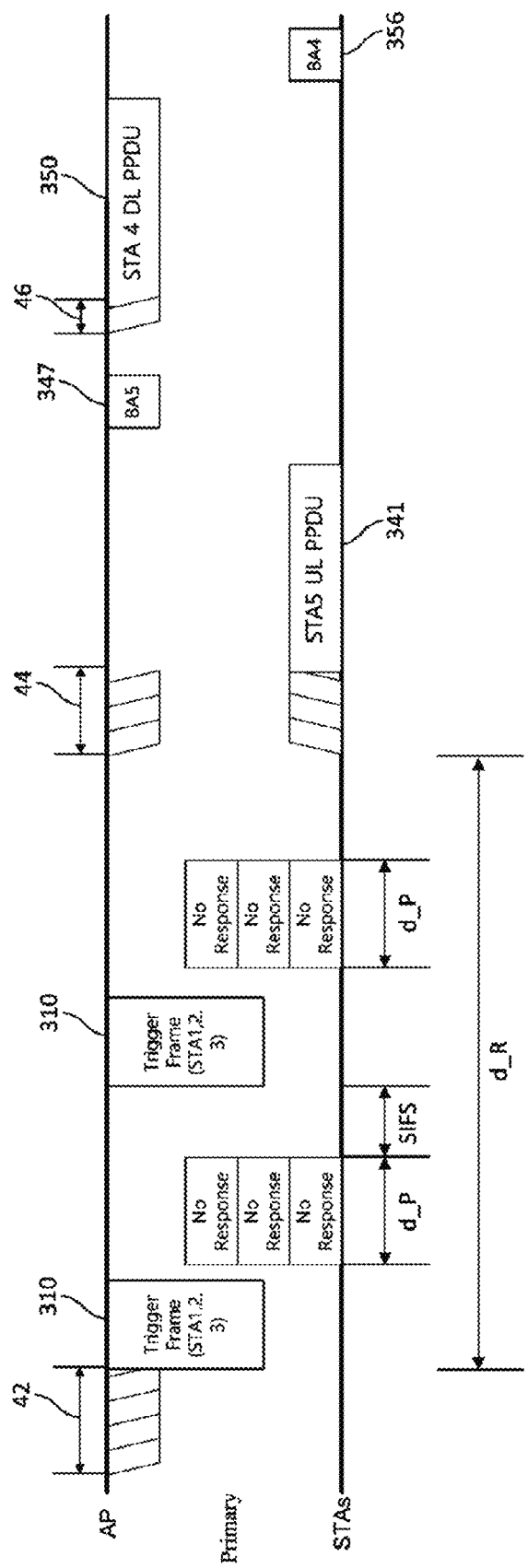
FIGS. 11 and 12 illustrate a scheduling method according to consecutive failure of an uplink multi-user transmission process.
Figure 12:
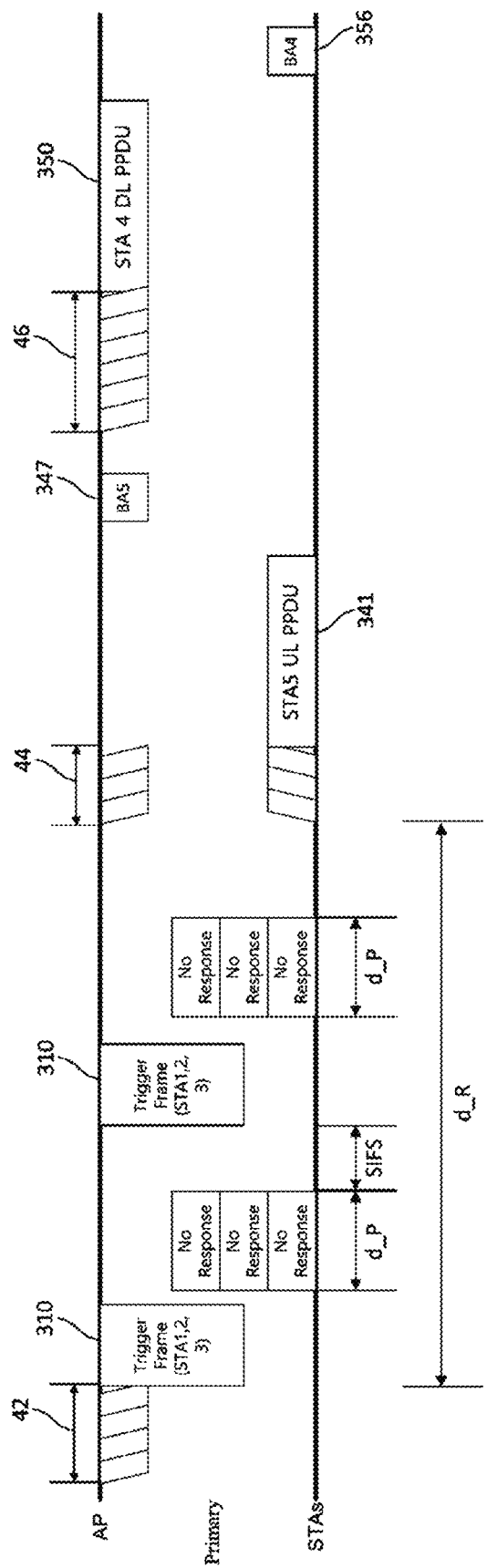

FIGS. 11 and 12 illustrated a scheduling method according to consecutive failure of an uplink multi-user transmission process. As described above, the retransmission of the trigger frame 310 may be performed until the UL-MU transmission based on the retransmission is successful within the predetermined count limit of retransmission or the predetermined time limit d_R of retransmission. However, if all the UL-MU transmission processes within the predetermined count limit of retransmission or the predetermined time limit d_R of retransmission have failed, operations of the terminals should be scheduled accordingly.

If all the UL-MU transmission processes within a predetermined number of times or a predetermined period of time have failed, the AP deletes the trigger frame 310 from the buffer and attempts to transmit another frame in the access category queue. The AP may attempt either a downlink single-user transmission, a downlink multi-user transmission, or a transmission of a new trigger frame in the next contention window intervals 44 and 46.

According to the embodiment of FIG. 11, if the UL-MU transmission process within a predetermined number of times or a predetermined period of time has failed, the AP may attempt the next transmission without increasing the size of the contention window. That is, the AP performs a backoff procedure based on an initial contention window value according to the access category of the packet to be transmitted. The AP obtains a new backoff counter within the initial contention window and accesses the channel based on the obtained backoff counter.

Referring to the embodiment of FIG. 11, the AP attempts to transmit downlink data 350 to STA4 after all the UL-MU transmission processes within the predetermined number of times or the predetermined period of time have failed. The AP obtains a backoff counter using an initial contention window based on the access category of the downlink data 350 and performs a backoff procedure in the contention window intervals 44 and 46 based on the obtained backoff counter. In the next contention window interval 44, STA5 wins the contention and transmits uplink data 341 to the AP. The AP receives the uplink data 341 transmitted by the STA5 and transmits an ACK 347 in response thereto. In the next contention window interval 46, the AP wins the contention and transmits downlink data 350 to the STA4. The STA4 receives the downlink data 350 transmitted by the AP and transmits an ACK 356 in response thereto.

Next, according to the embodiment of FIG. 12, if the UL-MU transmission process within the predetermined number of times or the predetermined period of time has failed, the AP may increase the size of the contention window for the next transmission. The AP determines that the contention is very severe when consecutive attempts of the UL-MU transmission have failed, and increases the size of the contention window to avoid channel congestion.

According to the embodiment of the present invention, the AP increases the size of the contention window without performing the retransmission of the trigger frame 314 when the UL-MU transmission process has failed. When the UL-MU transmission process has failed, the AP may attempt any one of a downlink single-user transmission, a downlink multi-user transmission, and a transmission of a new trigger frame in the next contention window interval. In this case, the AP may increase the contention window based on the access category of the packet to be transmitted. That is, when attempting a downlink single-user transmission or a downlink multi-user transmission, the AP obtains a new backoff counter by doubling the size of the contention window based on the access category of data to be transmitted. When transmitting a new trigger frame, the AP obtains a new backoff counter by doubling the size of the existing contention window based on the access category for the trigger frame. The AP uses the new backoff counter determined based on the increased contention window to contend with the STAs and access the channel.

Referring to the embodiment of FIG. 12, the AP increases the contention window based on the access category of the downlink data 350 and obtains a backoff counter using the increased contention window. The AP performs a backoff procedure for transmitting the downlink data 350 in the contention window intervals 44 and 46 based on the obtained backoff counter.

Figure 13:
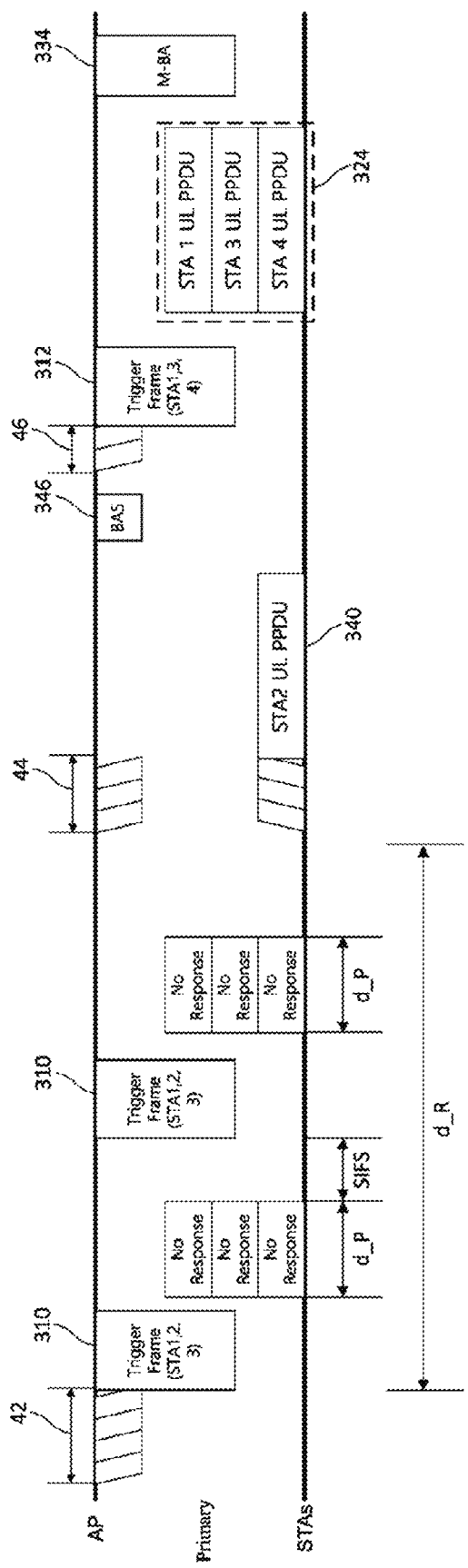
FIGS. 13 and 14 illustrate an embodiment in which a new trigger frame is transmitted after a failure of the uplink multi-user transmission process.
Figure 14:
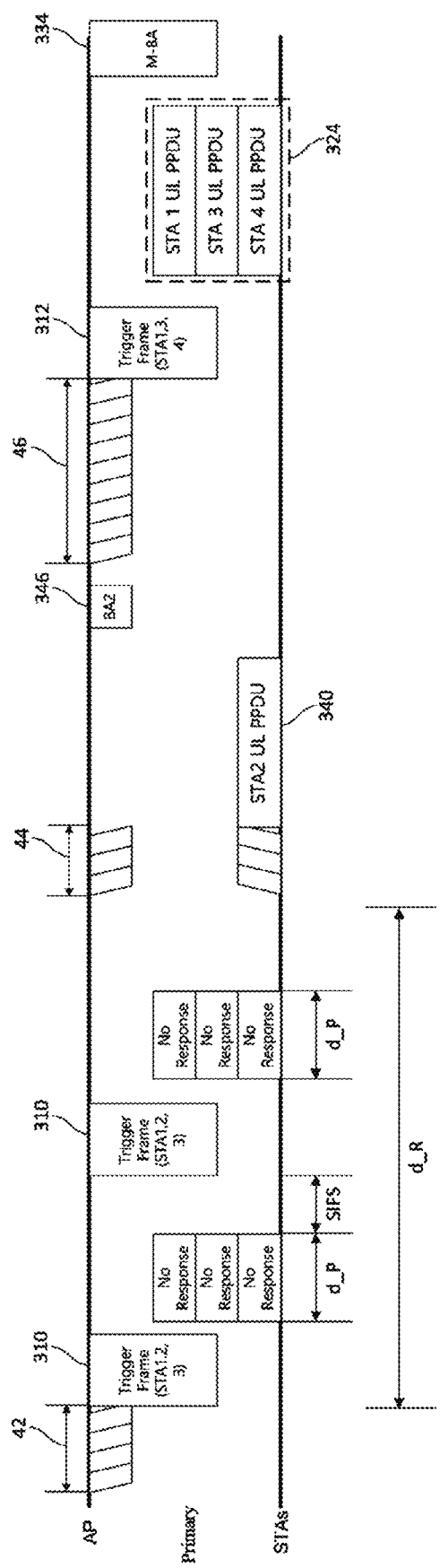

FIGS. 13 and 14 illustrate an embodiment in which a new trigger frame is transmitted after a failure of the uplink multi-user transmission process. If all of the UL-MU transmission processes within the predetermined number of times or the predetermined the time period have failed as described above, the AP may attempt either a downlink single-user transmission, a downlink multi-user transmission, or a transmission of a new trigger frame in the next contention window intervals 44 and 46. In the embodiment of FIGS. 13 and 14, the AP attempts to transmit a new trigger frame 312 in the next contention window intervals 44 and 46.

According to the embodiment of FIG. 13, the AP may attempt to transmit a new trigger frame 312 without increasing the size of the contention window. That is, the AP obtains a new backoff counter within the initial contention window based on the access category for the trigger frame. The AP contends with the STAs based on the new backoff counter and accesses the channel. The AP may obtain a new backoff counter without increasing the size of the contention window even though the previous UL-MU transmission process has finally failed.

Referring to the embodiment of FIG. 13, the AP obtains a backoff counter using the initial contention window based on the access category of the trigger frame 312, and performs a backoff procedure in the contention window intervals 44 and 46 based on the obtained backoff counter. In the next contention window interval 44, STA2 wins the contention and transmits uplink data 340 to the AP. The AP receives the uplink data 340 transmitted by the STA2 and transmits an ACK 346 in response thereto. In the next contention window interval 46, the AP wins the contention and transmits a new trigger frame 312. The new trigger frame 312 solicits uplink multi-user data transmission of STA1, STA3 and STA4. The STAs receive the new trigger frame 312 transmitted by the AP and transmit uplink multi-user data 324 in response thereto. In the embodiment of FIG. 13, STA1, STA3 and STA4 have successfully transmitted uplink data in response to the new trigger frame 312, and the AP transmits ACK information for STA1, STA3 and STA4 via the M-BA 334.

Next, according to the embodiment of FIG. 14, the AP may attempt to transmit a new trigger frame 312 after increasing the size of the contention window. The AP increases the contention window based on the access category for the trigger frame. According to an embodiment, the AP may double the size of the existing contention window based on the access category for the trigger frame. The AP obtains a new backoff counter based on the increased contention window and performs a backoff procedure for transmitting the new trigger frame 312 in the contention window intervals 44 and 46 based on the obtained new backoff counter.

Figure 15:
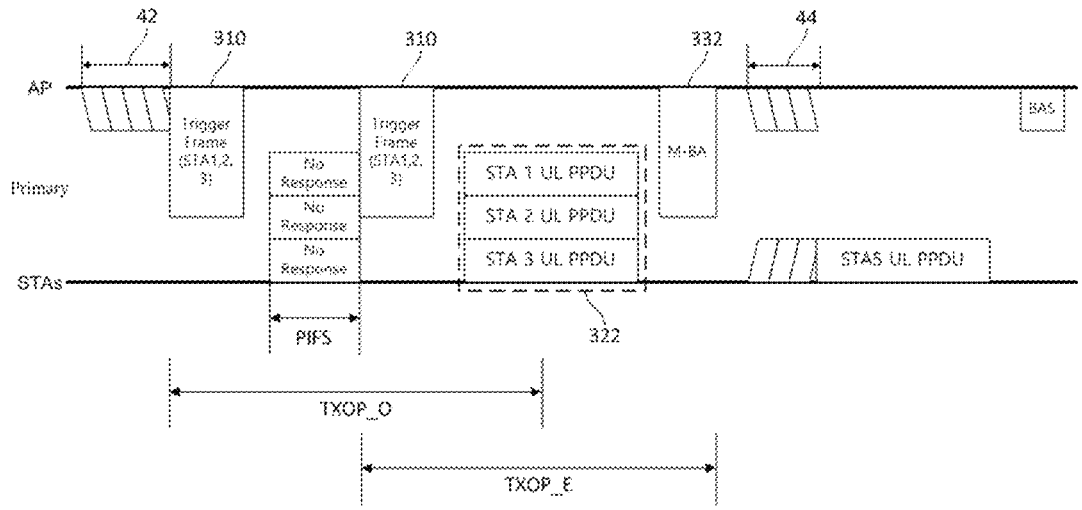
FIGS. 15 and 16 illustrate a trigger frame retransmission method according to another embodiment of the present invention.
Figure 16:
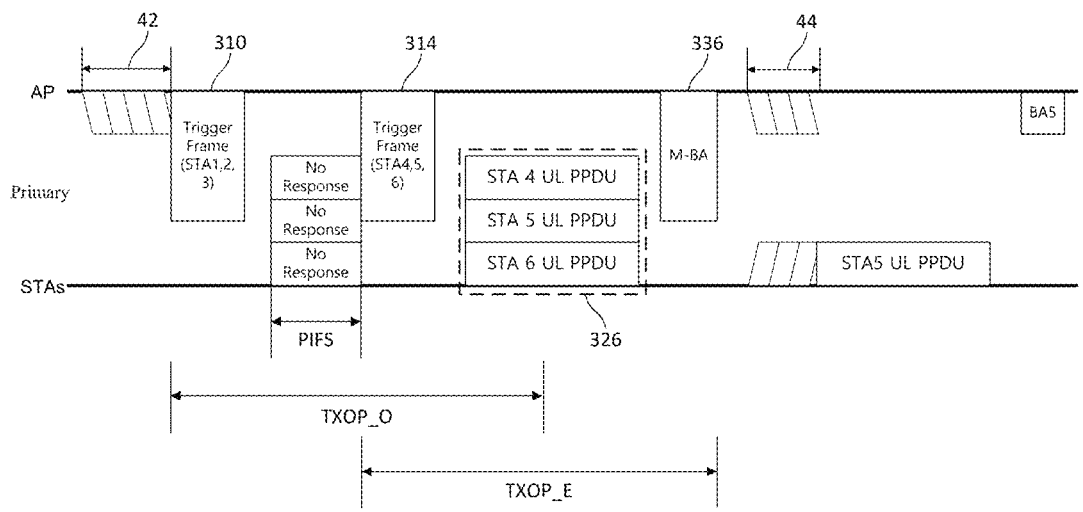

FIGS. 15 and 16 illustrate a trigger frame retransmission method according to another embodiment of the present invention. According to another embodiment of the present invention, the AP may perform retransmission of the trigger frame based on the PIFS recovery scheme. In this case, the AP may apply the PIFS recovery scheme to the transmission of the first trigger frame for securing a TXOP.

In the conventional PIFS recovery scheme, when the first frame of a set TXOP is successfully transmitted, the subsequent frames in the same TXOP can be retransmitted after a PIFS time in case of transmission failure. That is, when the transmission of the subsequent frame has failed, the corresponding frame is retransmitted after a PIFS time without any contention. According to an embodiment of the present invention, the AP applies such PIFS recovery scheme to the retransmission of the trigger frame. That is, when the first frame transmitted to secure a TXOP is a trigger frame (i.e., the first trigger frame), the PIFS recovery scheme is also applied to the corresponding trigger frame. The AP transmits the first trigger frame for initiating the UL-MU transmission process and transmits the second trigger frame when the channel is idle for a PIFS time from the transmission of the first trigger frame. In this case, the transmitted second trigger frame may be the retransmitted first trigger frame, or may be a new trigger frame.

Referring to the embodiment of FIG. 15, the AP immediately performs retransmission of the trigger frame 310 when the channel is idle for a PIFS time after the transmission of the first trigger frame 310 of the UL-MU transmission process. According to an embodiment, such a retransmission of the trigger frame 310 may be performed until the retransmission is successful within the first TXOP, i.e., TXOP_O set in the initial trigger frame 310.

When the trigger frame 310 is retransmitted, the STAs may perform the UL-MU transmission during an extended TXOP, i.e. TXOP_E, newly designated by the retransmitted trigger frame 310. In the embodiment of FIG. 15, STAs receive the retransmitted trigger frame 310 and transmit uplink multi-user data 322 in response thereto. In this case, the duration of the uplink multi-user data 322 is set based on TXOP_E. According to an embodiment, the TXOP_E value may be set equal to TXOP_O. Thus, when the trigger frame 310 is retransmitted, the TXOP of the UL-MU transmission may be shifted. In the embodiment of FIG. 15, STA1, STA2 and STA3 have successfully transmitted uplink data in response to the retransmitted trigger frame 310, and the AP transmits ACK information for STA1, STA2 and STA3 via the M-BA 332.

Referring to the embodiment of FIG. 16, the AP may transmit a new trigger frame 314 when the channel is idle for a PIFS time after the transmission of the first trigger frame 310 of the UL-MU transmission process. The new trigger frame 314 may have different scheduling information than the previously transmitted trigger frame 310. In the embodiment of FIG. 16, the initially transmitted trigger frame 310 solicits the uplink multi-user data transmission of STA1, STA2 and STA3, but the retransmitted trigger frame 314 solicits the uplink multi-user data transmission of STA4, STA5 and STA6 based on new scheduling information. STA4, STA5, and STA6 transmit uplink multi-user data 326 in response to the retransmitted trigger frame 314, and the AP receives the uplink multi-user data 326. The AP transmits ACK information of STA4, STA5 and STA6 via the M-BA 336 in response to the received uplink multi-user data 326.

As described above, according to the embodiment of FIGS. 15 and 16, if the UL-MU transmission process has failed, the AP retransmits the trigger frame after a PIFS time without any contention.

Figure 17:
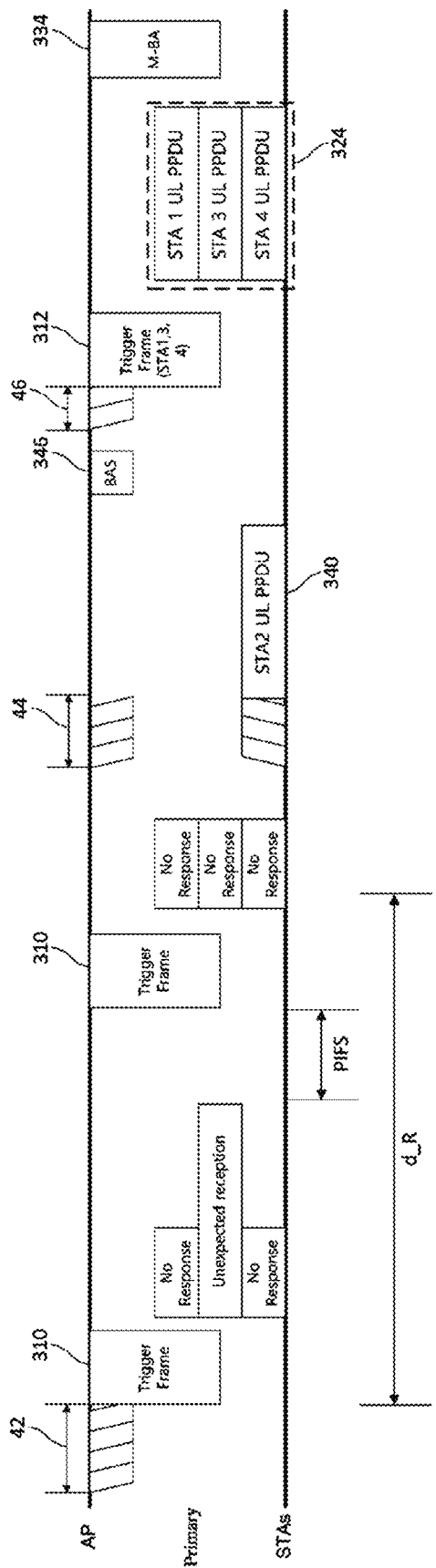
FIGS. 17 and 18 illustrate a trigger frame retransmission method according to yet another embodiment of the present invention.
Figure 18:
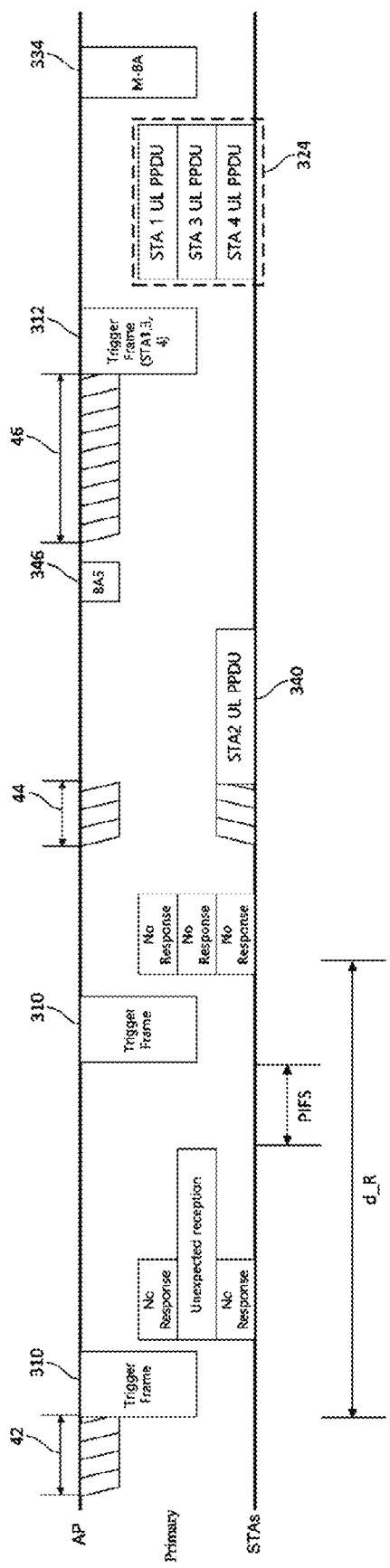

FIGS. 17 and 18 illustrate a trigger frame retransmission method according to yet another embodiment of the present invention. According to yet another embodiment of the present invention, the AP may perform the retransmission of the trigger frame based on the aforementioned PIFS recovery scheme for a predetermined retransmission time limit d_R.

First, referring to the embodiment of FIG. 17, if the UL-MU transmission process corresponding to the transmission of the trigger frame 310 has failed, the AP performs retransmission of the trigger frame 310 based on the PIFS recovery within the d_R time. In this case, the AP may perform the retransmission of the trigger frame 310 based on the PIFS recovery even if the channel is not idle immediately after the transmission of the initial trigger frame 310. For example, there may be a case where interference occurs between neighboring BSSs, collision occurs between frames, or a received frame is not decodable. In this case, the AP performs retransmission of the trigger frame 310 after a PIFS time from the time when the channel becomes idle. Meanwhile, FIG. 17 illustrates an embodiment in which the same trigger frame 310 is retransmitted based on the PIFS recovery, but the present invention is not limited thereto. That is, the AP may transmit a new trigger frame based on new scheduling information within d_R time.

If all the UL-MU transmission processes within the predetermined retransmission time limit d_R have failed, the AP terminates the transmission of the corresponding trigger frame 310 and attempts to transmit another frame in the access category queue. The AP may attempt either a downlink single-user transmission, a downlink multi-user transmission, or a transmission of a new trigger frame in the next contention window intervals 44 and 46. According to the embodiment of FIG. 17, if the UL-MU transmission process within the d_R time period has failed, the AP may attempt the next transmission without increasing the size of the contention window. That is, the AP performs the backoff procedure based on the initial contention window value according to the access category of the packet to be transmitted. The AP obtains a new backoff counter within the initial contention window and accesses the channel based on the obtained backoff counter.

Referring to the embodiment of FIG. 17, the AP attempts to transmit a new trigger frame 312 after all the UL-MU transmission processes within d_R time have failed. The AP obtains a backoff counter using the initial contention window based on the access category of the trigger frame 312 and performs a backoff procedure in the contention window intervals 44 and 46 based on the obtained backoff counter. In the next contention window interval 44, STA2 wins the contention and transmits uplink data 340 to the AP. The AP receives the uplink data 340 transmitted by the STA2 and transmits an ACK 346 in response thereto. In the next contention window interval 46, the AP wins the contention and transmits a new trigger frame 312. The new trigger frame 312 solicits uplink multi-user data transmission of STA1, STA3 and STA4. The STAs receive the new trigger frame 312 transmitted by the AP and transmit uplink multi-user data 324 in response thereto. In the embodiment of FIG. 17, STA1, STA3 and STA4 have successfully transmitted uplink data in response to the new trigger frame 312, and the AP transmits ACK information for STA1, STA3 and STA4 via the M-BA 334.

Next, according to the embodiment of FIG. 18, if all the UL-MU transmission processes within the d_R time have failed, the AP may increase the size of the contention window for the next transmission. The AP determines that the contention is very severe when the UL-MU transmission attempt based on the PIFS recovery have failed, and increases the size of the contention window to avoid channel congestion. The AP obtains a new backoff counter within the increased contention window and accesses the channel. A detailed exemplary embodiment thereof is as described above in the embodiment of FIG. 12.

<Cascaded Uplink Multi-User Transmission>

Figure 19:
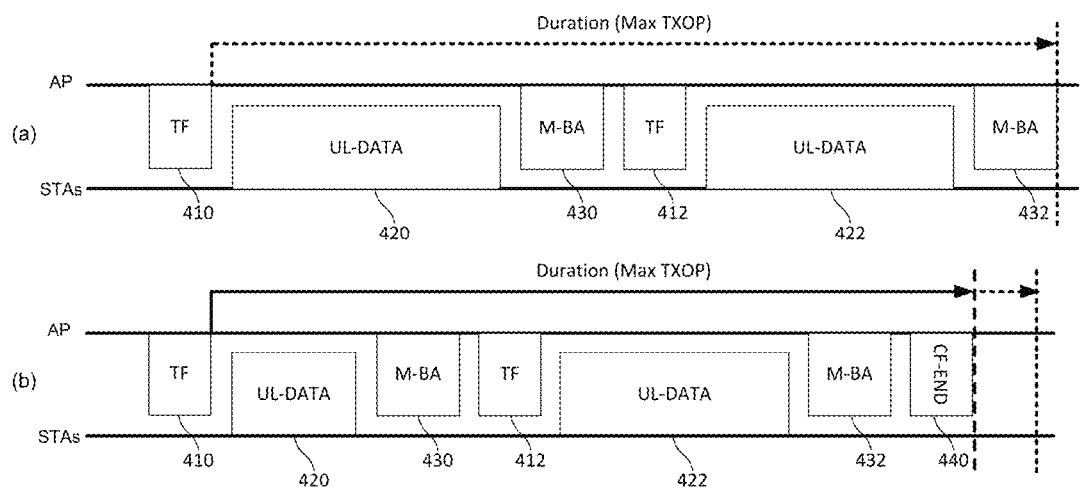
FIGS. 19 to 21 illustrate consecutive uplink multi-user transmission methods according to an embodiment of the present invention.
Figure 20:
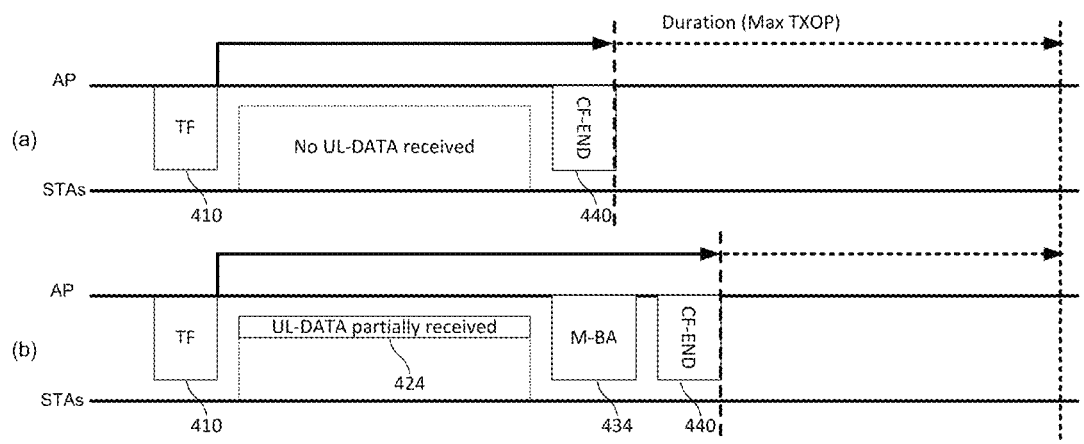
Figure 21:
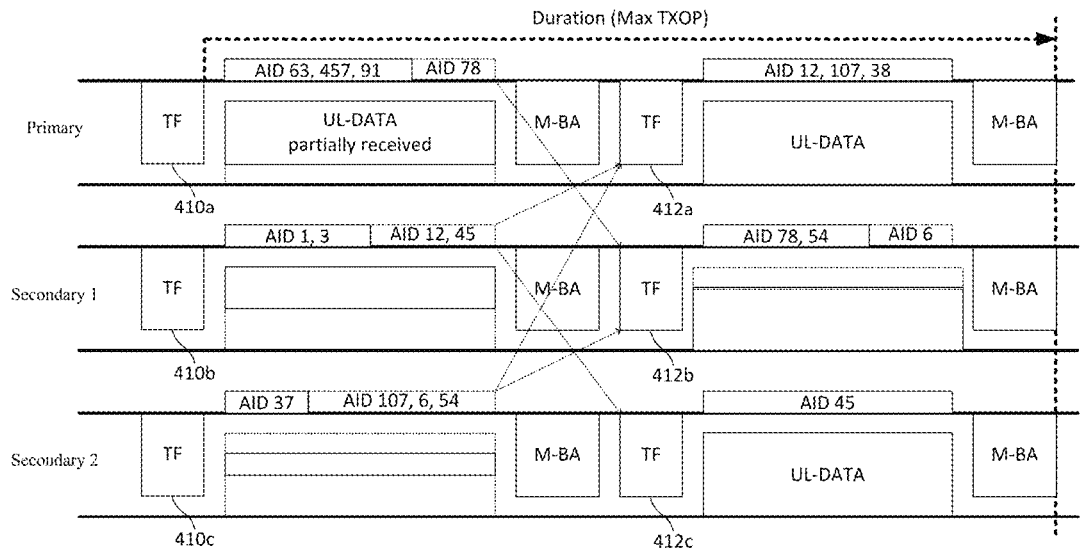

FIGS. 19 to 21 illustrate consecutive uplink multi-user transmission methods according to an embodiment of the present invention. Uplink multi-user data transmission is a scheme that maximizes spectral efficiency in terms of reducing overhead due to backoff contention among a plurality of STAs. Therefore, when starting the first uplink multi-user data transmission session, the AP may increase the transmission efficiency by setting a NAV to a length of the maximum available TXOP and triggering uplink multi-user data transmission as shown in FIG. 15. That is, the duration field of the trigger frame (i.e., TF) transmitted first for the uplink multi-user data transmission may be set to a value corresponding to the maximum TXOP. The AP obtains buffer state information of STAs in the BSS in advance, and allocates resources for uplink data transmission in consideration of uplink data size information, uplink data AC information, and channel selectivity of each STA. In the following embodiments and drawings, TF denotes a trigger frame, UL-DATA denotes uplink multi-user data, and M-BA denotes multi-STA block ACK.

FIG. 19 illustrates a consecutive uplink multi-user transmission method according to an embodiment of the present invention. First, referring to FIG. 19 (a), transmissions of a trigger frame 410, uplink multi-user data 420, and an M-BA 430 according to the aforementioned embodiment may be performed. If a NAV of a sufficient length remains for additional UL-MU transmission even after the completion of the transmission of the M-BA 430, the AP triggers the next UL-MU transmission without returning the NAV. To this end, the AP transmits a new trigger frame 412 SIFS after the M-BA 430 has been transmitted. A new UL-MU transmission process is performed by the transmission of a new trigger frame 412. That is, transmissions of uplink multi-user data 422 in response to the new trigger frame 412 and an M-BA 432 are additionally performed within the maximum TXOP.

According to an embodiment of the present invention, the M-BA 430 and the new trigger frame 412 may be combined and transmitted in a single aggregated MAC protocol data unit (A-MPDU). That is, when the uplink multi-user data 420 in response to the first trigger frame 410 is received, the AP may transmit an A-MPDU combined with the M-BA corresponding to the uplink multi-user data 420 and a second trigger frame. Accordingly, the ACK transmission for the previous UL-MU transmission and the trigger for the next UL-MU transmission can be performed through one frame.

FIG. 19 (b) illustrates a situation in which a NAV does not remain for a sufficient length for additional UL-MU transmission after the completion of transmission of the M-BA. According to an embodiment, the AP may transmit a CF-END frame 440 to terminate the UL-MU transmission process and return the NAV. According to another embodiment of the present invention, the AP may perform transmission of a downlink control frame, a management frame, etc. of a short length during the remaining NAV interval.

As described above, according to the embodiment of the present invention, consecutive UL-MU transmissions may be performed for a predetermined period. According to an embodiment, the predetermined period may be a predefined maximum TXOP. According to another embodiment, the AP may flexibly select the predetermined period in consideration of the number of terminals in the BSS, the uplink/downlink transmission ratio, the traffic congestion, and the like.

FIG. 20 illustrates a cancellation method of a consecutive uplink multi-user transmission process according to another embodiment of the present invention. When the network is congested, the STAs may not be able to transmit uplink data in response to the trigger frame 410 of the AP, or the AP may not be able to receive uplink data of the STAs. Alternatively, the AP may receive only a part of uplink data 424 in response to the trigger frame 410. In this case, the subsequent UL-MU transmission process may also be predicted to be difficult due to the congestion situation.

Therefore, as in the embodiment of FIG. 20 (a), if uplink multi-user data in response to the trigger frame 410 is not received, the AP may transmit the CF-END frame 440 to cancel the TXOP and terminate the UL-MU transmission process. On the other hand, as in the embodiment of FIG. 20 (b), when a part of uplink multi-user data 424 in response to the trigger frame 410 is received, the AP may transmit an M-BA 434 corresponding to the data 424 and transmit an CF-END frame 440 thereafter. According to an embodiment, the AP may transmit the CF-END frame 440 when uplink multi-user data 424 is received from less than or equal to a predetermined number of STAs in response to the trigger frame 410.

FIG. 21 illustrates a consecutive uplink multi-user transmission method using multiple channels according to yet another embodiment of the present invention. According to the embodiment of the present invention, the aforementioned consecutive uplink multi-user transmission process may be performed through a wideband channel of 20 MHz or more. FIG. 21 shows an embodiment in which an uplink multi-user transmission process is performed through a primary channel, a secondary channel 1 and a secondary channel 2. In the embodiment of FIG. 21, duplicated descriptions of parts which are the same or corresponding to those of the aforementioned embodiments of FIGS. 19 and 20 will be omitted.

First, the AP transmits trigger frames 410a, 410b and 410c through a plurality of channels, that is, a primary channel, a secondary channel 1, and a secondary channel 2. The trigger frames 410a, 410b and 410c may be transmitted via separate frames on a 20 MHz channel basis. Alternatively, the trigger frames 410a, 410b and 410c may be transmitted via one frame through a plurality of channels. In the embodiment of FIG. 21, the trigger frame 410a transmitted through the primary channel solicits uplink multi-user transmission by allocating the primary channel to STAs having AID values of 63, 457, 91 and 78. The trigger frame 410b transmitted through the secondary channel 1 solicits uplink multi-user transmission by allocating the secondary channel 1 to STAs having AID values of 1, 3, 12 and 45. In addition, the trigger frame 410c transmitted through the secondary channel 2 solicits uplink multi-user transmission by allocating the secondary channel 2 to STAs having AID values of 37, 107, 6 and 54.

However, the communicable channel of each terminal in the BSS may be different depending on the position of the corresponding terminal and the channel occupancy status of the neighboring BSSs. Accordingly, a situation may occur in which a resource unit is allocated through the trigger frame transmitted by the AP but the STA fails to transmit uplink multi-user data. According to the embodiment of the present invention, when uplink multi-user data is not received from a STA designated by the trigger frame, the AP may allocate another channel (or resource unit) to the corresponding STA in the next UL-MU transmission process to solicit uplink multi-user transmission. That is, when uplink data is not received from a STA to which the first channel (or the first resource unit) is allocated through the first trigger frame, the AP allocates the second channel (or the second resource unit) to the STA in the next second trigger frame to solicit uplink multi-user transmission. In this case, the first trigger frame and the second trigger frame are different trigger frames transmitted within a predetermined period (for example, maximum TXOP) for consecutive UL-MU transmissions.

Referring to the embodiment of FIG. 21, a second UL-MU transmission process based on a second trigger frame (412a, 412b and 412c) is initiated by following a first UL-MU transmission process based on a first trigger frame (410a, 410b and 410c). The AP initiates the second UL-MU transmission process by allocating another channel to a STA that has failed to transmit uplink multi-user data in the first UL-MU transmission process. For example, a STA of AID 78 allocated with the primary channel by the first trigger frame 410a is newly allocated with the secondary channel 1 by the second trigger frame 412b. In addition, STAs of AID 12 and AID 45 allocated with the secondary channel 1 by the first trigger frame 410b are newly allocated with the primary channel and the secondary channel 2 by the second trigger frames 412a and 412c, respectively.

As described above, in the consecutive UL-MU transmission process, the AP generates new scheduling information for STAs that have failed to transmit uplink multi-user data, and transmits a trigger frame based on the new scheduling information.

Figure 22:
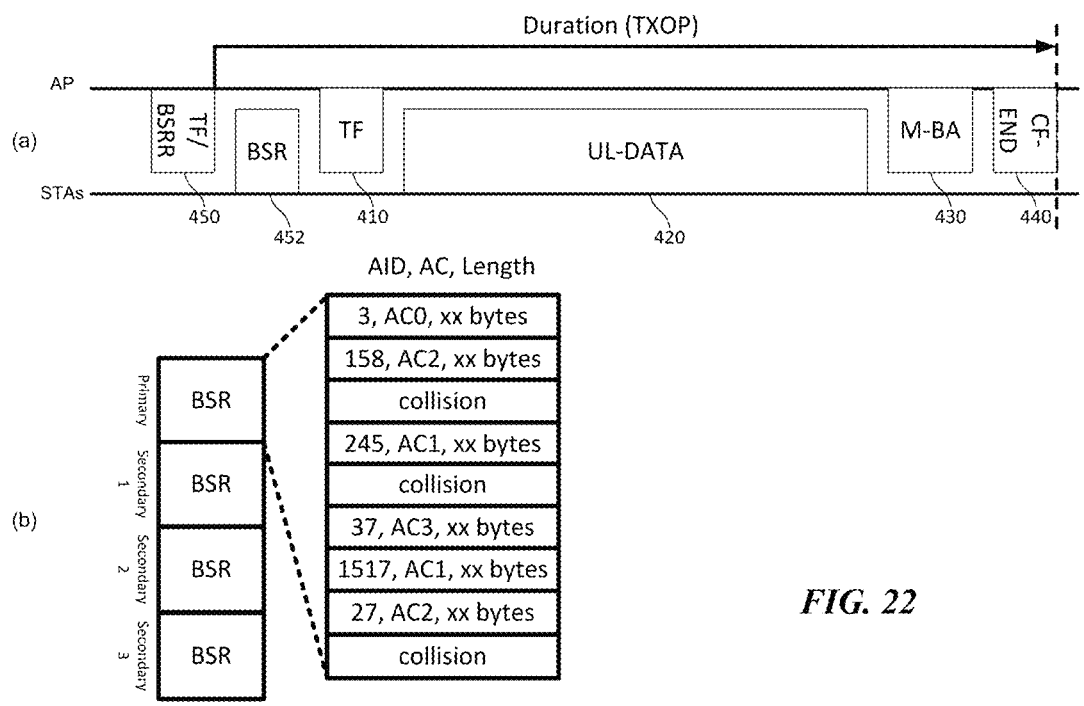
FIG. 22 illustrates a method of a buffer status report and an uplink multi-user transmission based thereon according to an embodiment of the present invention.

FIG. 22 illustrates a method of a buffer status report and an uplink multi-user transmission based thereon according to an embodiment of the present invention. First, referring to FIG. 22 (a), in order to increase the spectrum efficiency of the UL-MU transmission process, a buffer status report (BSR, 452) of STAs may be transmitted before the UL-MU transmission starts. In order to solicit the STAs to transmit buffer status report 452, the AP may transmit a buffer status report request (BSRR, 450). STAs having uplink data to be transmitted among the STAs having received the buffer status report request 450 randomly select one of the resource units allocated for the buffer status report 452 and transmits the buffer status report 452. Upon receiving the buffer status report 452, the AP allocates a resource unit based on the secured buffer status information and transmits a trigger frame 410 for starting transmission of the UL-DATA.

FIG. 22 (b) illustrates a configuration of a buffer status report according to an embodiment of the present invention. According to the embodiment of the present invention, the buffer status report transmitted by the STA includes at least one of identifier information of the corresponding STA, size (i.e., length) information of data to be transmitted by the STA, and an access category (AC) of data to be transmitted by the STA. The identifier information of the STA represents one of an AID, a partial AID, or a MAC address of the STA.

In the embodiment of FIG. 22 (b), the AP has allocated resource units for transmitting buffer status reports to a total of four channels in units of 20 MHz, that is, a primary channel, a secondary channel 1, a secondary channel 2, and a secondary channel 3. In this case, the resource units for transmitting the buffer status report may be allocated in units of sub-channels further subdivided in the 20 MHz channel. In the embodiment of FIG. 22 (b), each allocated resource unit represents a random access-based resource unit. STAs having uplink data to be transmitted select any resource unit among the allocated resource units and transmit a buffer status report composed of the above information.

According to an embodiment of the present invention, an additional control method for reducing the probability of a collision occurrence of a random access based buffer status report transmission in a network congestion state can be used. The STA may obtain a transmission probability based on the access category to be transmitted by the corresponding terminal, and may transmit the buffer status report based on the obtained transmission probability. Table 1 shows transmission probabilities of buffer status report according to the access categories of data.

TABLE 1

| Management | P0 |
|---|---|
| AC_VO | P1 |
| AC_VI | P2 |
| AC_BE | P3 |
| AC_BK | P4 |

Here, P0>P1>P2>P3>P4.

In addition, AC_VO indicates a voice access category, AC_VI indicates a video access category, AC_BE indicates a best effort access category, and AC_BK indicates a background access category.

According to the embodiment of the present invention, STAs transmitting the buffer status report allocate different probability values according to the access category of data to be transmitted to perform a differential access. That is, the STA having data of an access category with a high probability value has the higher transmission probability of the buffer status report. According to an embodiment, the higher the priority of the access category of data to be transmitted is, the higher the transmission probability of the buffer status report is. Upon receiving the buffer status report request, the STAs determine whether or not to transmit the buffer status report based on the probability determined according to the access category of the data in the buffer of the corresponding terminal.

Figure 23:
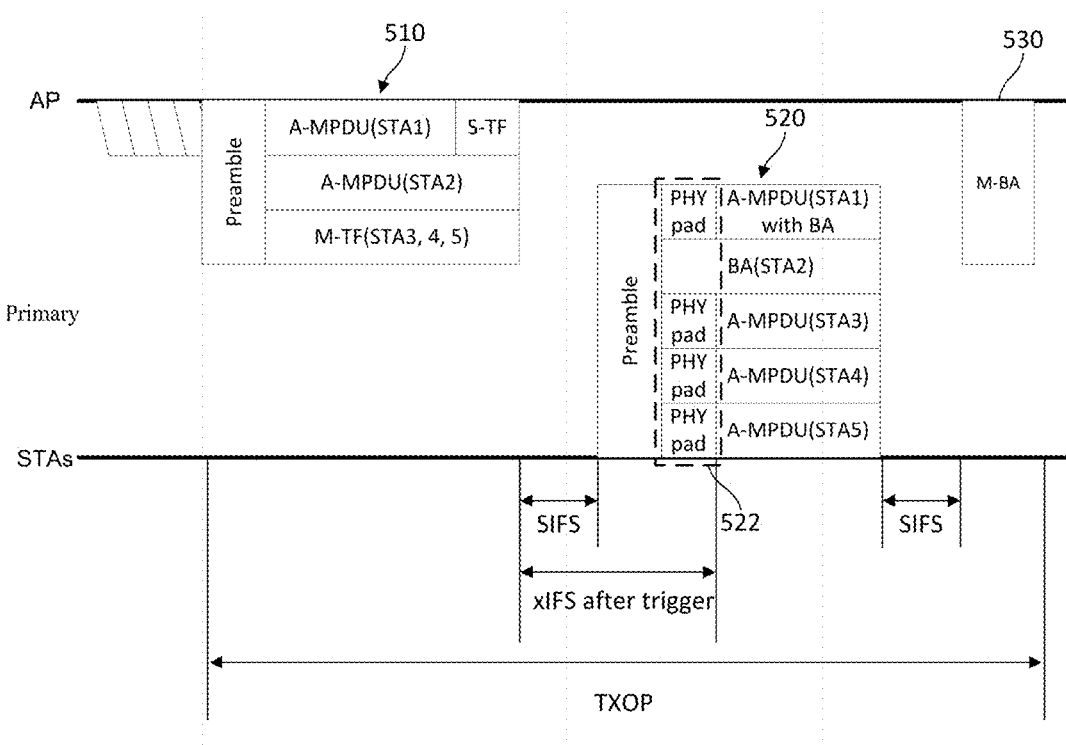
FIGS. 23 and 24 illustrate an uplink multi-user transmission process according to a further embodiment of the present invention.
Figure 24:
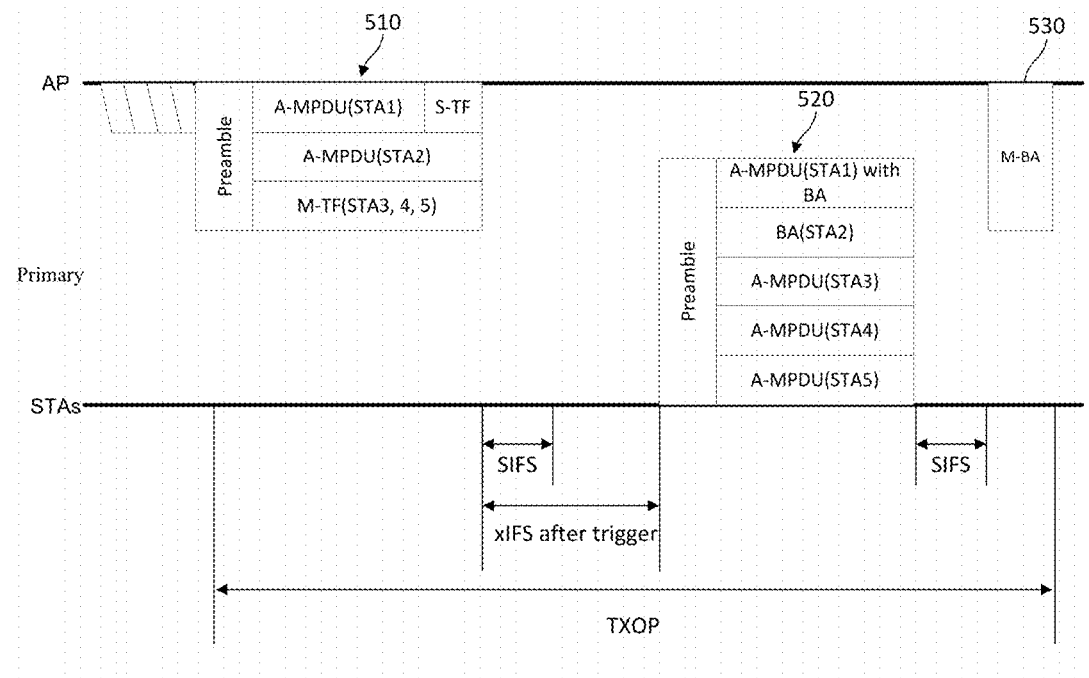

FIGS. 23 and 24 illustrate an uplink multi-user transmission process according to a further embodiment of the present invention. When the trigger frame is transmitted, STAs should transmit uplink multi-user data after a predetermined IFS time. In this case, the STAs need processing time for receiving the trigger frame and participating in the UL-MU transmission in response thereto.

First, according to the embodiment of FIG. 23, padding can be used to secure the processing time for the UL-MU transmission. First, the AP transmits a downlink packet 510 including a trigger frame for starting the UL-MU transmission. According to an embodiment, the AP may transmit a downlink packet 510 in which downlink data and the trigger frame are aggregated. In the embodiment of FIG. 23, M-TF denotes a trigger frame indicating multiple users, and S-TF denotes a trigger frame indicating a single user. According to an embodiment, the AP may transmit trigger information for a receiving STA of the downlink data included in the downlink packet 510 via the S-TF and trigger information for other STAs via the M-TF.

When the downlink packet 510 including the trigger frame is transmitted, the STAs transmit an uplink packet 520 including uplink multi-user data in response thereto. According to an embodiment, the uplink packet 520 in response to the trigger frame may be transmitted a SIFS time after the transmission of the trigger frame has been completed. Accordingly, the uplink packet 520 may be transmitted after the downlink packet 510 of the AP is transmitted and before an ACK timer of the AP expires. In the embodiment of FIG. 23, uplink data of STA1, STA3, STA4 and STA5 is transmitted along with a block ACK of STA2 via the uplink packet 520.

According to an embodiment of the present invention, a PHY padding 522 may be performed on the uplink packet 520 transmitted in response to the trigger frame. That is, STAs to transmit the uplink multi-user data transmit the preamble of the uplink packet 520 a SIFS time after the reception of the trigger frame, and transmit a padding 522 waveform until the transmission of the uplink data (e.g., A-MPDU) becomes available. Assuming that the time from when the trigger frame is received to when the uplink data (e.g., A-MPDU) is transmitted is an xIFS, the STAs transmitting the uplink multi-user data perform the PHY padding 522 for a time of xIFS-SIFS. In this case, the xIFS has a value larger than the SIFS. The STAs transmit the uplink multi-user data immediately after the PHY padding 522. The AP receives the uplink multi-user data transmitted by the STAs and transmits an M-BA 530 in response thereto.

Next, according to the embodiment of FIG. 24, an extended ACK timer may be applied to secure the processing time for the UL-MU transmission. That is, the uplink packet 520 in response to the trigger frame may be transmitted a predetermined xIFS time after the transmission of the trigger frame has been completed. In this case, the predetermined xIFS is set to the time of a SIFS+n*slot (where n is an integer of 1 or more). In the embodiment of FIG. 24, since the extended ACK timer is applied, the STAs can secure the time for configuring the uplink multi-user data in response to the trigger frame. Accordingly, the STAs may transmit the uplink data (e.g., A-MPDU) immediately after the preamble of the uplink packet 520.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A station (STA) comprising:
    a transceiver configured to transmit and receive wireless signals; and
    a processor configured to process wireless signals transmitted or received through the transceiver,
    wherein the processor is configured to:
    receive a first trigger frame through a channel from an access point (AP),
    wherein the first trigger frame includes size information and placement information of a resource unit allocated for the STA and indicates transmission of an uplink data to one or more STAs,
    transmit the uplink data in response to the first trigger frame, and
    receive a second trigger frame after a point coordination function (PCF) interframe space (PIFS) time,
    wherein the second trigger frame is transmitted when the channel is determined to be idle during the PIFS time through carrier sensing of the AP before transmitting the second trigger frame and a predetermined transmission opportunity (TXOP) is sufficient for transmission of the second trigger frame, and
    wherein the channel is determined to be idle during the PIFS time for transmission of the second trigger frame through a carrier sensing procedure.

2. The STA of claim 1,
    wherein the second trigger is transmitted when the AP does not receive at least one uplink data in response to the first trigger frame from the one or more STAs and indicates retransmission of the uplink data to the one or more STAs.

3. The STA of claim 2,
    Wherein an uplink multi-user transmission for the at least one uplink data is determined to be successful when the AP receives the at least one uplink data in response to the first trigger frame from the one or more STAs.

4. The STA of claim 2,
    wherein an uplink multi-user transmission for the at least one uplink data is determined to be failed when the AP does not receive the at least one uplink data in response to the first trigger frame from the one or more STAs.

5. The STA of claim 4,
    wherein a new back-off counter for transmitting the second trigger frame is generated when the AP does not receive the at least one uplink data in response to the first trigger frame, and
    wherein the new backoff counter is used by the AP to perform a backoff procedure.

6. A wireless communication method of a station (STA), the method comprising:
    receiving a first trigger frame through a channel from an access point (AP),
    wherein the first trigger frame includes size information and placement information of a resource unit allocated for the STA and indicates transmission of an uplink data to one or more STAs;
    transmitting the uplink data in response to the first trigger frame; and
    receiving a second trigger frame after a point coordination function (PCF) interframe space (PIFS) time,
    wherein the second trigger frame is transmitted when the channel is determined to be idle during the PIFS time through carrier sensing of the AP before transmitting the second trigger frame and a predetermined transmission opportunity (TXOP) is sufficient for transmission of the second trigger frame, and wherein the channel is determined to be idle during the PIFS time for transmission of the second trigger frame through a carrier sensing procedure.

7. The method of claim 6,
wherein the second trigger is transmitted when the AP does not receive at least one uplink data in response to the first trigger frame from the one or more STAs and indicates retransmission of the uplink data to the one or more STAs.

8. The method of claim 7,
wherein an uplink multi-user transmission for the at least one uplink data is determined to be successful when the AP receives the at least one uplink data in response to the first trigger frame from the one or more STAs.

9. The method of claim 7,
wherein an uplink multi-user transmission for the at least one uplink data is determined to be failed when the AP does not receive the at least one uplink data in response to the first trigger frame from the one or more STAs.

10. The method of claim 9,
wherein a new back-off counter for transmitting the second trigger frame is generated when the AP does not receive the at least one uplink data in response to the first trigger frame, and
wherein the new backoff counter is used by the AP to perform a backoff procedure.

* * * * *